(12) United States Patent　　(10) Patent No.: US 8,572,317 B2
　Kim　　(45) Date of Patent: Oct. 29, 2013

(54) MEMORY DEVICE AND METHOD TO GENERATE RESUME DATA FOR A MEDIA FILE THAT IS INTERRUPTED WHILE BEING REPRODUCED

(75) Inventor: Kwang-jun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 452 days.

(21) Appl. No.: 12/507,673

(22) Filed: Jul. 22, 2009

(65) Prior Publication Data

US 2010/0023689 A1　　Jan. 28, 2010

(30) Foreign Application Priority Data

Jul. 23, 2008　(KR) .......................... 10-2008-0071902

(51) Int. Cl.
　*G06F 13/00*　(2006.01)
(52) U.S. Cl.
　USPC ........................... 711/115; 711/103; 711/154

(58) Field of Classification Search
　USPC ........................................ 711/115, 154, 165
　See application file for complete search history.

(56) References Cited

U.S. PATENT DOCUMENTS

| 2008/0092043 | A1* | 4/2008 | Trethewey | 715/705 |
| 2008/0288099 | A1* | 11/2008 | Thanos et al. | 700/94 |
| 2009/0172598 | A1* | 7/2009 | Yamanaka et al. | 715/841 |

* cited by examiner

*Primary Examiner* — Reba I Elmore
(74) *Attorney, Agent, or Firm* — NSIP Law (57) ABSTRACT

A memory device having a resume function is provided. The memory device provides the resume function that generates and stores reproduction history information when reproduction of data is stopped due to the generation of an interrupt, providing the production history information to a newly connected reproducing apparatus, and resuming reproducing of the data from a location where the reproduction of the data had previously been stopped. Since the reproduction history information is stored in the memory device, the data reproduction may be resumed from the location where reproduction of the data was stopped when the memory device is moved from one reproducing apparatus to another reproducing apparatus.

29 Claims, 5 Drawing Sheets

MEMORY DEVICE AND METHOD TO GENERATE RESUME DATA FOR A MEDIA FILE THAT IS INTERRUPTED WHILE BEING REPRODUCED

CROSS-REFERENCE TO RELATED APPLICATION

This application claims the benefit under 35 U.S.C. §119(a) of Korean Patent Application No. 10-2008-0071902, filed on Jul. 23, 2008, the disclosure of which is herein incorporated by reference in its entirety for all purposes.

BACKGROUND

1. Field

The following description relates to a memory device, and more particularly, to a memory device in which resume data is stored.

2. Description of the Related Art

With the development of information communication technologies, the physical size of memory devices continues to decrease even as the memory devices provide more functions. In addition, due to development of large-capacity compact memory devices at reduced cost, the popularity of these various memory devices has grown.

One representative example of such a memory device is the Universal Serial Bus (USB) memory. Since USB memories have a high speed and a compact size, they are ideally suited for use in data communications between memory devices and external devices.

A USB memory may store various types of information. With the increased capacity found in typical USB memories, many people now store multimedia files as well as documents in USB memories. Multimedia files stored in a USB memory may be reproduced by a computer connected to the USB memory. Since the USB memory is portable and allows reproduction multimedia files stored therein at any computer connected to the USB memory, a user can reproduce their multimedia files wherever desired.

However, in the case of a conventional USB memory, it is inconvenient for user to resume replay of a media file that is stopped when the USB memory is moved from one device to another.

SUMMARY

In one general aspect, a memory device includes a storage device to store data; an interface configured to provide the stored data to a reproducing device to reproduce the data; and a controller configured to generate resume data when an interrupt occurs while the stored data is reproduced from the memory device, to store the resume data in the storage device, and to transmit the resume data to one of the reproducing device and another reproducing device to resume reproduction of the stored data from a location where reproduction of the stored data was interrupted.

The stored data may be one or more of multimedia data and an application program.

The controller may be configured to generate the resume data when the interrupt is generated in response to manipulation of the memory device by a user. The controller also may be configured to generate the resume data when the interrupt is generated in response to disconnecting of the memory device from the reproducing device. In addition, the controller may be configured to generate the resume data, the resume data including one or more of information about the stored data being reproduced, information about the location where reproduction of the stored data was interrupted, and information about a time when the interrupt occurs.

The memory device may be one of a Universal Serial Bus (USB) memory stick and a memory card.

The memory device also may include a display to display an image corresponding to the data being reproduced. The display may be configured to display the image corresponding to the stored data including a visual indication that is representative of the stored data being reproduced. The display also may be configured to display the image corresponding to the stored data, the image including one or more of a title of the stored data and a playtime of the stored data. In addition, the display may be further configured to maintain display of the image displayed when the interrupt occurs.

The data storage device may include a first data storage to store the data and a second data storage to store the resume data.

The memory device also may include a user interface configured to reset the memory device by deleting the resume data and/or removing the maintained image from the display.

In another general aspect, a method of reproducing data by connecting a memory apparatus storing the data to a reproducing apparatus includes: generating resume data when an interrupt occurs while the data from the memory apparatus is reproduced; storing the resume data in the memory apparatus; and transmitting the resume data to the reproducing apparatus configured to resume reproduction of the data by the reproducing apparatus based on a location where the interrupt occurred.

The data reproduced may include one or more of multimedia data and an application program.

Generating the resume data may include generating resume data in response to the interrupt indicating stopping of reproduction of the data caused by a manipulation of the memory device by a user. Generating the resume data also may include generating resume data in response to the interrupt indicating the memory device has been disconnected. Generating the resume data also may include generating information about one or more of the data being reproduced, information about a location where the interrupt occurs, and information about a time when the interrupt occurs.

In yet another general aspect, a portable memory device is configured to be received by media player devices configured to play media files. The portable memory device includes: a storage device to store a media file; an interface configured to provide the stored media file to a media player device for playback of the stored media file by the media player device; and a controller device configured to generate resume data when playback of the stored media file is interrupted, to store the resume data in the storage device, and to transmit the resume data to one of the media player device and another media player device to resume playback of the stored media file from a location where playback was interrupted.

The controller may be configured to generate the resume data when playback is interrupted in response to manipulation of the memory device by a user. The controller also may be configured to generate the resume data when playback is interrupted in response to disconnecting of the memory device from the media player device. The controller also may be configured to generate the resume data, the resume data including one or more of information about the media file being played when playback was interrupted, information about the location where playback was interrupted, and information about a time when playback was interrupted.

The memory device may be one of a Universal Serial Bus (USB) memory stick and a memory card.

The memory device also may include a display configured to display an image corresponding to the stored media file including a visual indication that is representative of the media file being played.

The memory device also may include a display configured to display an image corresponding to the stored media file being played, wherein the image includes one or more of a title of the stored media file and a playtime of the stored media file. The display may be further configured to maintain display of the image displayed when playback of the stored media file is interrupted.

However, other features and aspects will be apparent from the following description, the drawings, and the claims.

BRIEF DESCRIPTION OF THE DRAWINGS

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION

The following description relates to a memory device having an automated resume function to resume reproduction of data from a previous location where the reproduction of the data had been stopped. The detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
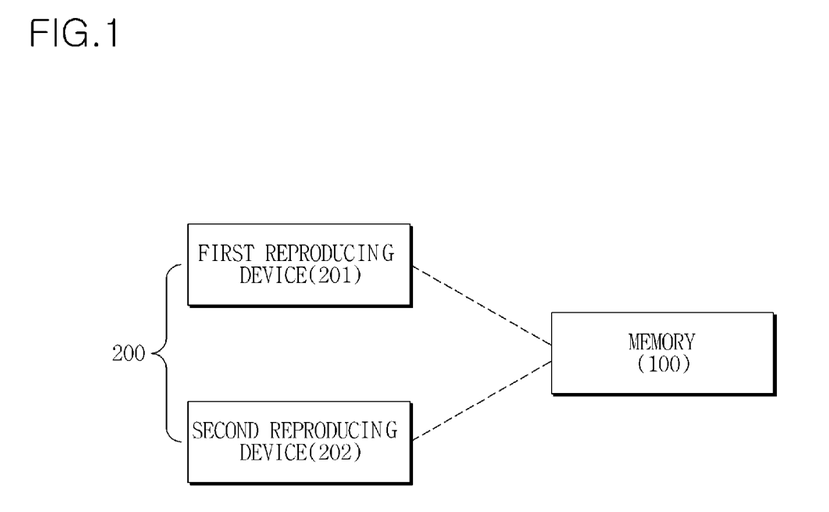
FIG. 1 is an exemplary memory device system.

FIG. 1 shows an exemplary memory device 100. Referring to FIG. 1, the memory device 100 may be a Universal Serial Bus (USB) memory stick or a memory card in which data is stored. The memory device 100 may be connected to a reproducing apparatus 200 or through a predetermined communication interface. The data which is stored in the memory device 100 may be multimedia data, such as audio files, video files, graphic files, and the like, or various other application programs.

The reproducing apparatus 200 reads and reproduces data stored in the memory device 100. The reproducing apparatus 200 may be a computer, a moving picture experts group (MPEG)-1 Audio Layer 3 (MP3) player, a portable media player (PMP), and the like. The reproduction apparatus 200 may include a codec to reproduce the data according to a format of the data or a driver program to execute the application programs.

The memory device 100 also includes a resume function. The resume function stores reproduction history information during reproduction of data and resumes reproduction of the data from a specific location based on the reproduction history information. The memory device 100 generates the reproduction history information and stores the reproduction history information therein while data is being reproduced. The memory device 100 also provides the reproduction history information to any reproducing apparatus when the memory device 100 is newly connected to the reproducing apparatus so that the reproducing apparatus can resume reproduction of the data from a specific location based on the reproduction history information.

For example, assume that a movie is stored in the memory device 100, and the memory device 100 is connected to a first reproducing apparatus 201. The first reproducing apparatus 201 plays the movie. Then, the memory device 100 is disconnected from the first reproducing apparatus 201 while the movie is being played back thereby stopping playback of the movie. The memory device 100 stores the location at which playback of the movie was stopped when the memory device was disconnected from the first reproducing apparatus 201. The memory device 100 is then connected to a second reproducing apparatus 202. The memory device 100 transmits the stored location to the second reproducing apparatus 202 when the memory device 100 is connected to the second reproducing apparatus 202. As a result, a user is able to resume viewing the movie from the location where the movie had been stopped.

The resume function also may be applied to resume various types of application programs in addition to resuming multimedia data, such as movies. For example, an earthquake simulation program stored in the memory device 100 also may be resumed. When an interrupt occurs during execution of the simulation program, the memory device 100 stores a point at which the simulation is stopped. The memory device then transmits the stored information to the reproducing apparatus 200 once the memory device 100 is reconnected to the reproducing apparatus 200 to resume simulation from the point where the interrupt has occurred.

Figure 2:
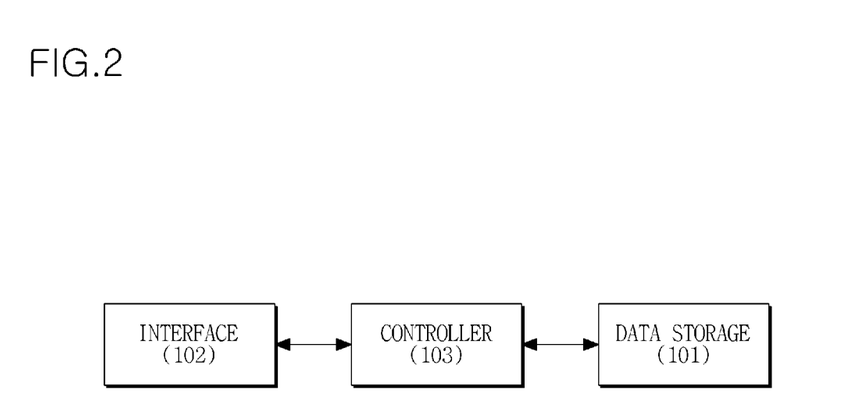
FIG. 2 is a block diagram of an exemplary schematic construction of a memory device.

FIG. 2 is a block diagram showing an exemplary schematic construction of a memory device 100. Referring to FIG. 2, the memory device 100 includes a data storage device 101, an interface 102, and a controller 103.

The data storage device 101 may be a Random Access Memory (RAM), a Read Only Memory (ROM), an Electrically Erasable Programmable Read-Only Memory (EEPROM), a flash memory, and the like. Various data including application programs may be stored in the data storage device 101. The data storage 101 may be generally divided into at least two sectors. For example, the data may be stored in one sector, and the resume data, described in greater detail below, may be stored in another sector.

The interface 102 is used to communicate with the reproducing apparatus 200. The interface 102 may be, for example, a USB interface, a communication port, and the like.

The controller 103 receives or transmits data from or to the reproducing apparatus 200 through the interface 102. For example, the central processing unit (CPU) of the controller 103 is connected to the CPU of the reproducing apparatus 200 through the interface 102. Control signals exchanged between the controller 103 and reproducing apparatus 200 are transmitted and received through the interface 102.

If an interrupt occurs while data is being reproduced by the reproducing apparatus 200, the controller 103 controls the interruption of the reproduction process by generating and storing the resume data. In one example, the interrupt randomly stops reproduction of data before reproduction of the data is complete. An interrupt may occur when the user manipulates the reproducing apparatus 200 to stop reproducing the data or when the memory device 100 is arbitrarily disconnected from the reproducing apparatus 200 while the data is being reproduced by the reproducing apparatus 200. Arbitrary disconnection of the memory device 100 from the reproducing apparatus 200 may include disconnecting communication between the memory device 100 and reproducing apparatus 200.

As an example, if the user presses a pause button provided on the reproducing apparatus 200 to stop reproduction of data while the data is reproduced by the reproducing apparatus 200, the reproducing apparatus 200 generates an interrupt occurrence signal and transmits the signal to the controller 103. Accordingly, the controller 103 determines that an interrupt has occurred from the received interrupt occurrence signal.

As another example, if the memory device 100 is disconnected from the reproducing apparatus 200 while data is reproduced by the reproducing apparatus 200, continued communications between the controller 103 and reproducing apparatus 200 become impossible. As a result, the controller 103 detects the disconnection of communications and generates an interrupt occurrence signal.

When the interrupt occurs, the controller 103 generates resume data and stores the resume data. The resume data is associated with a reproduction history. The resume data may include information about which data is presently being reproduced and information about the interrupt. In one example, the information about the interrupt may include a time elapsed from the start of reproduction of the data to the stop of reproduction of the data. The elapsed time may be counted using a clock signal supplied to the controller 103 or the interrupt occurrence signal received from the reproducing apparatus 200.

When the controller 103 determines that the memory device 100 is connected to a new reproducing apparatus (e.g., when the memory device 100 is moved from the reproducing apparatus 201 to the reproducing apparatus 202), the controller 103 transfers the resume data to the new reproducing apparatus to resume reproduction the data from the location where the interrupt occurred.

For example, if the memory device 100 is disconnected from the first reproducing apparatus 201 stopping reproduction of a movie stored in the data storage 101 during playback by the first reproducing apparatus 201, the controller 103 generates data (i.e., resume data) about the title of the movie and a time elapsed from the start of the reproduction of the movie to the time the memory device 100 is disconnected from the first reproducing apparatus 201, and the controller 103 stores the resume data in the data storage 101. Thereafter, when the memory device 100 is connected to the second reproducing apparatus 202, the controller 103 transfers the resume data to the second reproducing apparatus 202 so that the movie may be resumed from the location where playback had been stopped.

Figure 3:
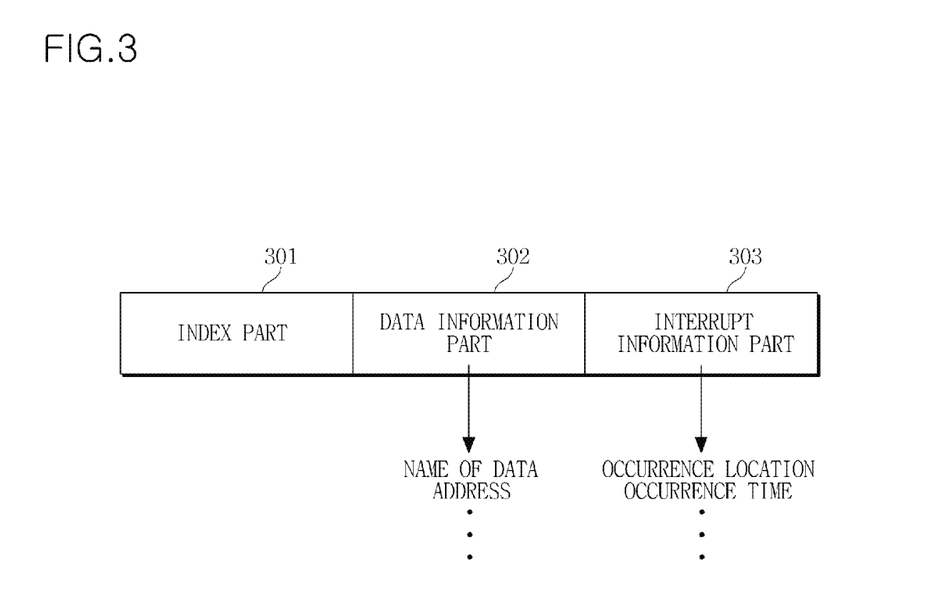
FIG. 3 shows an exemplary data structure of resume data.

FIG. 3 shows an exemplary data structure of the resume data. Referring to FIG. 3, the resume data may include an index part 301, a data information part 302, and an interrupt information part 303.

The index part 301 includes information about reproduction. For example, the index part 301 may be a header of the resume data. If the reproduction apparatus 200 receives data having the structure illustrated in FIG. 3, the reproduction apparatus 200 performs a resume function with reference to the index part 301. The index part 301 also may include resume control information. The resume control information may be a control instruction for resuming reproduction based on a location where an interrupt has occurred or a control instruction to query a user whether to resume reproduction from the location where the interruption has occurred when the reproducing apparatus 200 receives the resume data.

The data information part 302 includes information about the data that was being reproduced when the interrupt occurred. For example, the data information part 302 includes the name of stored data, a location where the data is stored, and the like.

The interrupt information part 303 includes information regarding the location of where the interrupt of the reproduction of the data has occurred. For example, the interrupt information part 303 includes a location at which reproduction of the data stopped, a time elapsed from the start of the reproduction of the data until the stop of the reproduction of the data, and the like.

For example, the reproduction apparatus 200 receiving the resume data illustrated in FIG. 3 informs the user by reference to the index part 301 that the reproduction of the data has previously been stopped using a display installed in the reproduction apparatus 200. The reproduction apparatus queries the user whether to resume reproduction of the data from the location where the reproduction of the data was stopped (i.e., whether to use the resume function).

The reproduction apparatus 200 also receives the data from the memory device 100 with reference to the data information part 302 and detects the location where the reproduction of the data was stopped using the interrupt information included in the interrupt information part 303. As a result, the reproduction apparatus 200 is able to resume reproduction of the data from the location where the reproduction of the data had been stopped.

According to the example illustrated in FIG. 3, the reproducing apparatus 200 receives the resume data and fetches a video clip corresponding to the resume data from the data storage 101 at an address obtained from the data information part 302. The reproducing apparatus 200 then detects a location in the video clip corresponding to an interrupt occurrence time, and prepares to reproduce the data from the location.

Figure 4:
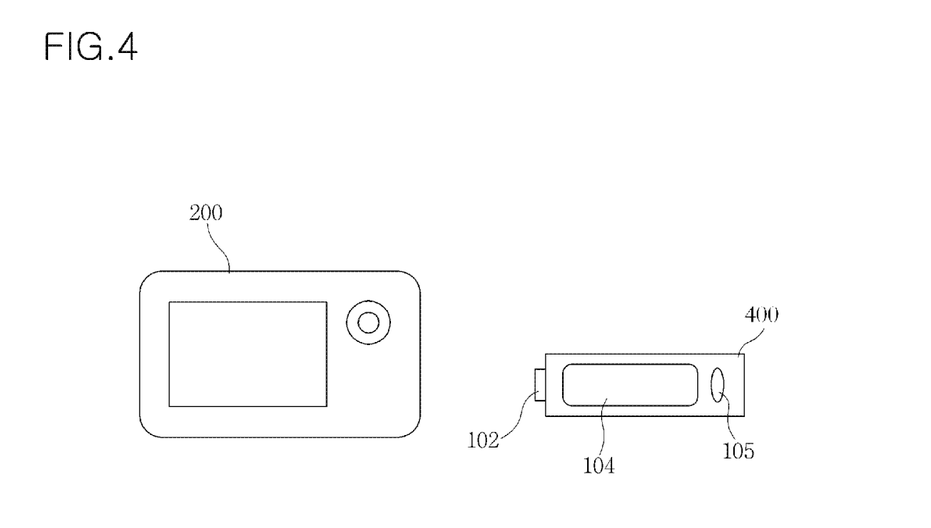
FIG. 4 shows an exemplary outer appearance of a memory device.
Figure 5:
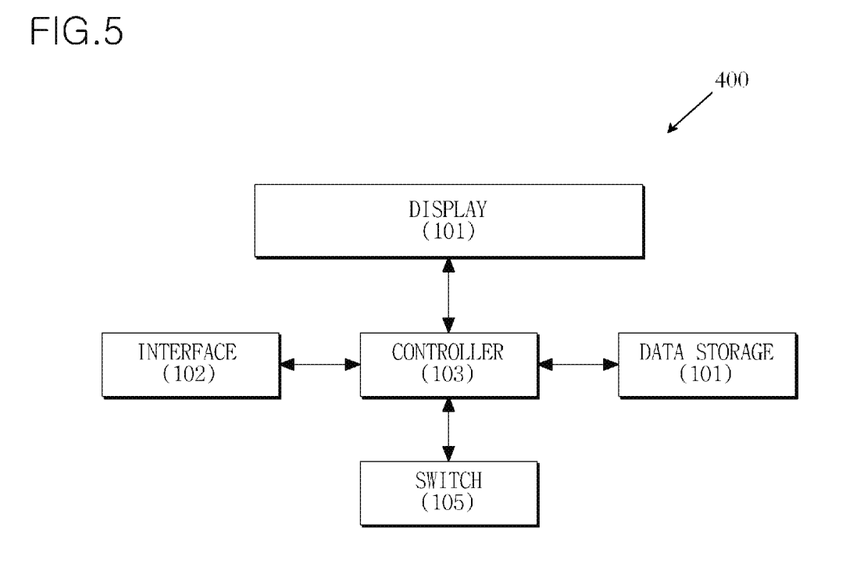
FIG. 5 is a block diagram of an exemplary schematic construction of a memory device.

FIG. 4 shows another exemplary memory device 400, and FIG. 5 is a block diagram showing one exemplary schematic construction of the memory device 400. Referring to FIGS. 4 and 5, the memory device 400 includes a data storage device 101, an interface 102, a controller 103, a display 104, and a switch 105.

The memory device 400 shown in FIGS. 4 and 5 is similar to the memory device 100 illustrated in FIG. 1 but includes the addition of a display 104 and a switch 105. The resume function performed by the data storage 101, the interface 102 and the controller 103 may be implemented as described above with reference to FIG. 2, therefore their descriptions are not repeated for conciseness.

The display 104 may display images corresponding to data stored by the storage device 400. The display 104 may be a Liquid Crystal Display (LCD), Organic Light Emitting Diode (OLED) display, or Bistable Cholesteric Display (BCD). The BCD is suitable to be used in the memory device 100 because the BCD is able self-illuminate or maintain an image even when the device 400 is powered off. If an LCD or an OLED display is used as the display 101, the display 101 may be set to turn off after a predetermined time elapses or to change its ON/OFF state whenever a user touches the LCD screen.

The display 104 may display information that is representative about the data being reproduced. For example, the display 104 may display the title, the playtime, and the like associated with the data presently being reproduced. In addition, the display 104 is able to maintain display of the image or enter a power-off state to save power, if an interrupt occurs while data is reproduced.

The switch 105 adjusts the various functions of the memory device 400, and includes at least one button.

Figure 6:
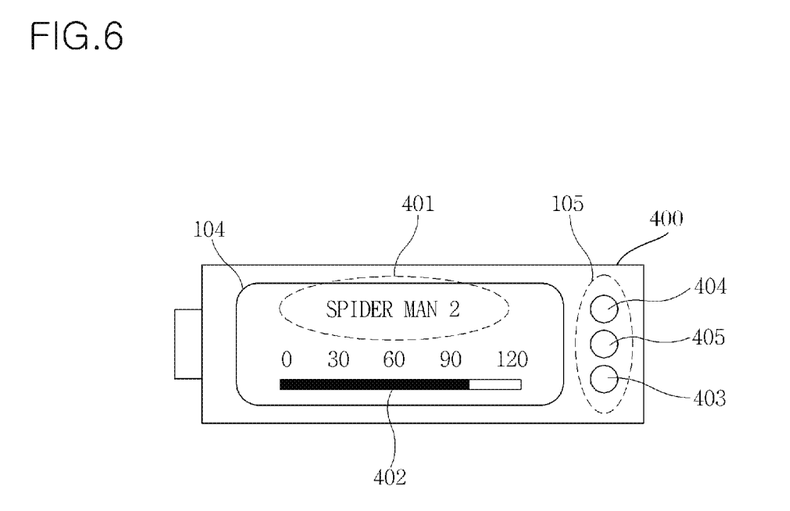
FIG. 6 shows an exemplary exterior appearance of a memory device.

FIG. 6 shows an exemplary exterior appearance of the memory device 400. Referring to FIG. 6, if an interrupt occurs by disconnecting the memory device 400 from a reproducing apparatus that is reproducing a video clip stored in the memory device 400, the memory device 400 generates the resume data and maintains display of the image displayed when the interrupt occurs.

For example, the display 104 may display the title 401 of a movie that was being reproduced, and a playtime 402 of the movie from the start of the movie to the point when the movie was stopped. Accordingly, the user is able to easily recognize the point at which he or she stopped viewing the movie by reading the information displayed on the display 104.

As shown in FIG. 6, the switch 105 may include a button 404 to turn the memory device 400 ON or OFF, a button 405 to turn the display 104 ON or OFF, and a reset button 403 to delete stored resume data.

In one example, the user may delete resume data by pressing the reset button 403 of the switch 105. For example, if the image illustrated in FIG. 6 is displayed and maintained on the display 104 when the memory device 400 is disconnected from a reproducing apparatus during playback of a move, the user may cause the image to disappear and delete the resume data by pressing the reset button 403.

The switch 105 also may include a data scan function. For example, if the memory device stores various types of files therein, the files may be sequentially scanned using a toggle button (not shown) additionally installed in the switch 105.

Figure 7:
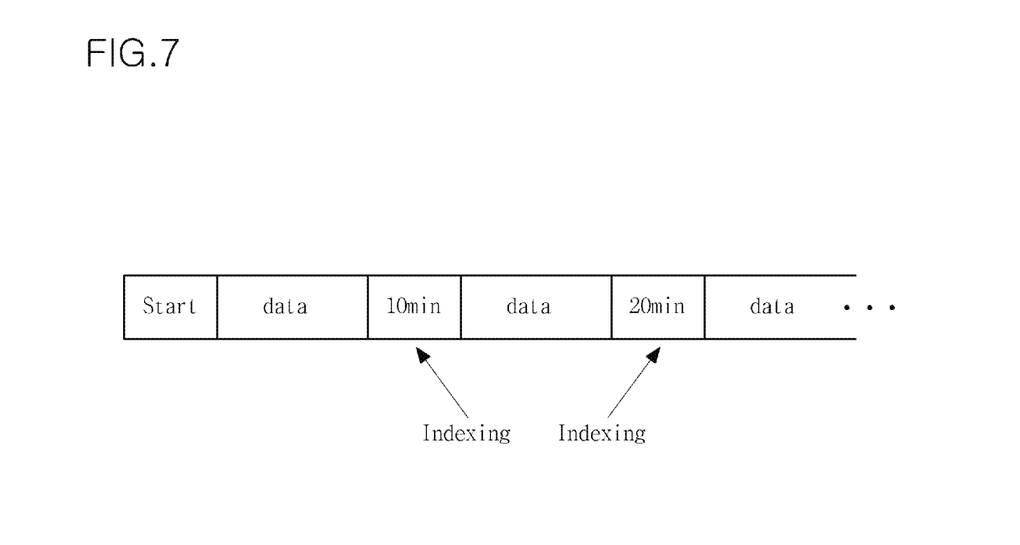
FIG. 7 shows an exemplary data structure of multimedia data.

FIG. 7 shows an exemplary data structure of multimedia data. Referring to FIGS. 5 and 7, the controller 103 may index video clips that are to be stored in the data storage 101, in advance, at regular time intervals, before the video clips are reproduced. In this case, an interrupt occurrence location may be designated using the indexing information allowing quick detection of the interrupt occurrence location by the reproducing apparatus 200.

Figure 8:
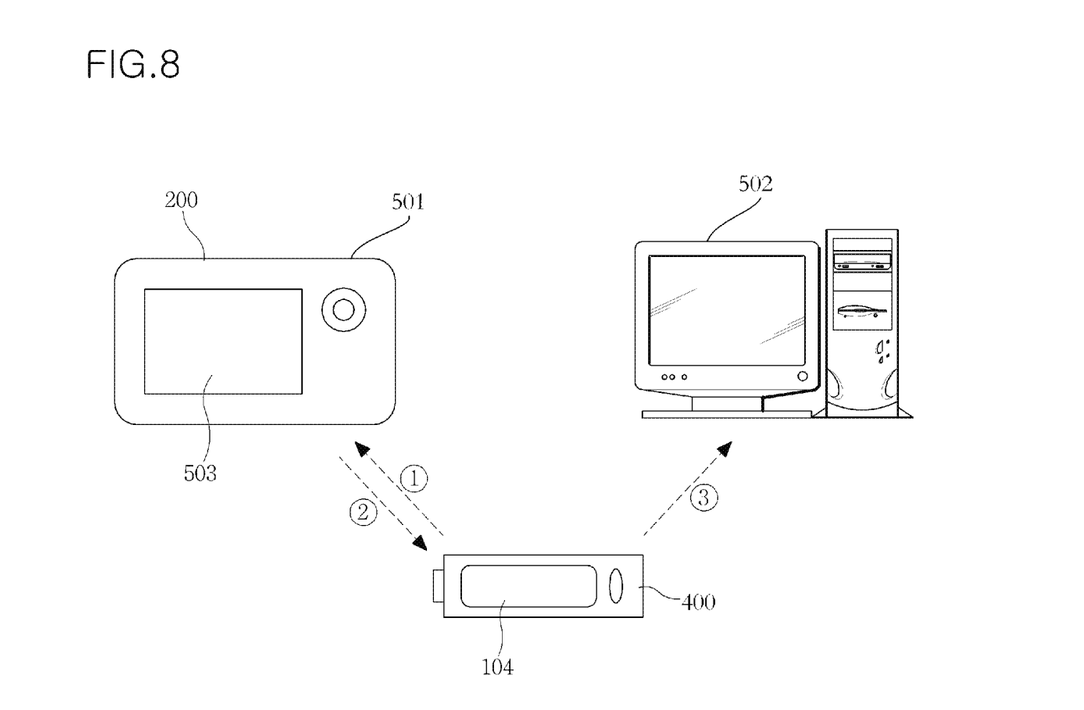
FIG. 8 shows an example of the use of a memory device.

FIG. 8 illustrates an example of the user of the memory device. In this example, the memory device 400 stores a plurality of movies. A user views a movie "A" while travelling by connecting the memory device 400 to a PMP 501. Thereafter, the user stops reproduction of the movie "A" after reaching home, disconnects the memory card 400 from the PMP 501, and connects the memory card 400 to a computer 502 located in the home to continue viewing of the movie "A."

When the memory device 400 is connected to the PMP 501, the CPU of the PMP 501 connected to the memory device 400 reads and reproduces the multimedia data stored in the memory device 400 to play the movie "A" on a display 503. If the user disconnects the memory device 400 from the PMP 501 while the movie "A" is played to stop viewing the movie "A," the memory device 400 generates the resume data including the title and the playtime of the movie "A," stores the resume data, and displays information associated with the resume data on the display 104.

The memory device 400 is then connected to the computer 502, and the memory device 400 transmits the resume data to the computer 502. After receiving the resume data, the computer 502 reads the corresponding multimedia data from the memory device 400 using the multimedia data information included in the resume data. The computer 502 also detects a location corresponding to the interrupt occurrence time and resumes reproduction of the movie "A" from the location at which the user stopped viewing the movie "A."

As a result, the user may view the display 104 of the memory device 400 to check the reproduction history of the multimedia data. In addition, reproduction of the multimedia data may be resumed in the newly connected reproducing apparatus from the location where the reproduction of the multimedia data was last stopped without any other manipulation.

Figure 9:
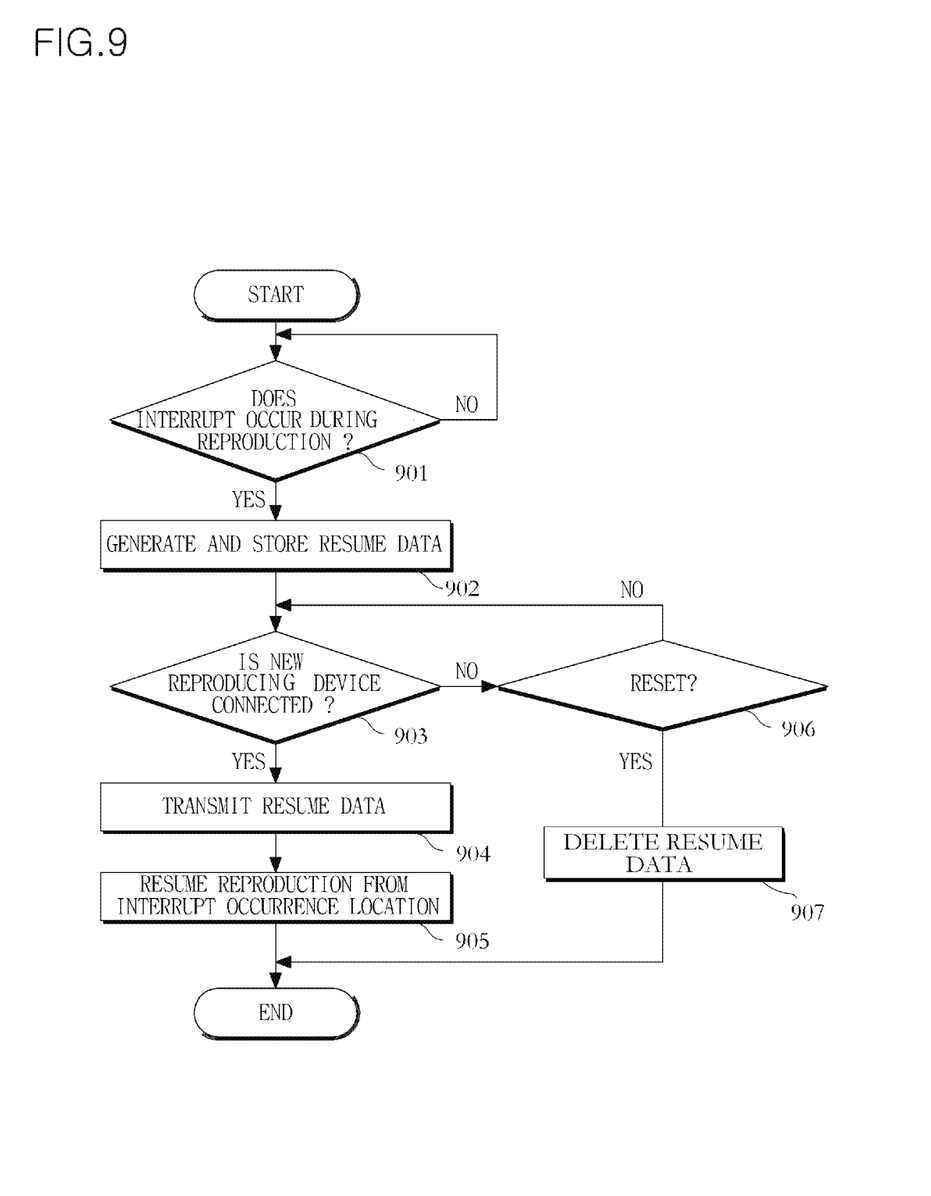
FIG. 9 is a flowchart of an exemplary data reproduction method.

FIG. 9 is a flowchart of an exemplary data reproduction method. The data reproduction method may be implemented to reproduce data by connecting a memory device storing the data to a predetermined reproducing apparatus. The memory device may be the memory device 100 or 400 described above, and the data stored in the memory device may be multimedia data or various application programs.

Referring to FIG. 9, the controller of the memory device determines whether an interrupt occurs while data is reproduced (901). The interrupt may occur, for example, when a user stops reproducing the data by manipulating the reproducing apparatus, or by arbitrarily disconnecting the memory device from the reproducing apparatus. The occurrence of the interrupt may be determined when a controller included in the memory device detects the memory device has been disconnected from reproduction apparatus, or when the reproduction apparatus transmits an interrupt occurrence signal to the memory device.

If the controller determines that an interrupt has occurred, the memory device generates resume data and stores the resume data (902). The resume data includes reproduction history information. The resume data also may include index information, information regarding the corresponding data, interrupt information, and the like, as described with reference to FIG. 3 above.

The controller determines whether the memory device has been connected to a new reproducing apparatus (903). If the controller determines that the memory device has been connected to a new reproducing apparatus, the stored resume data is transmitted to the new reproducing apparatus (904). The reproducing apparatus resumes reproduction of data from the location where the interrupt occurred by reference to the received resume data (905).

If the memory device has not been connected to a new reproducing apparatus, the control determines whether a reset signal is applied to the memory device (906). If the reset signal is applied to the memory device, the resume data is deleted and the process is terminated (907). Otherwise, the controller continues to determine whether the memory device has been connected to a new reproducing apparatus (903).

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory device comprising:
   a storage device to store media files;
   an interface configured to provide a media file to a reproducing device to reproduce the media file; and
   a controller configured to generate resume data in response to an interrupt occurring while the media file is being reproduced by the reproducing device, to store the resume data in the storage device, and to transmit the resume data to one of the reproducing device and another reproducing device,
   wherein the resume data comprises information to resume reproduction of the media file from a location at which reproduction of the media file was interrupted.

2. The memory device of claim 1, wherein the media file is one or more of multimedia data and an application program.

3. The memory device of claim 1, wherein the controller is configured to generate the resume data in response to manipulation of the memory device by a user.

4. The memory device of claim 1, wherein the controller is configured to generate the resume data in response to the memory device being disconnected from the reproducing device.

5. The memory device of claim 1, wherein the resume data comprises one or more of information about the media file being reproduced, information about the location at which reproduction of the media file was interrupted, and information about a time when the interrupt occurs.

6. The memory device of claim 1, wherein the memory device is one of a Universal Serial Bus (USB) memory stick and a memory card.

7. The memory device of claim 1, further comprising a display to display an image corresponding to the media file being reproduced.

8. The memory device of claim 7, wherein the display is configured to display the image corresponding to the media file including a visual indication that is representative of the media file being reproduced.

9. The memory device of claim 7, wherein the image comprises one or more of a title of the media file and a playtime of the media file.

10. The memory device of claim 7, wherein the display is further configured to maintain display of the image displayed when the interrupt occurs.

11. The memory device of claim 1, wherein the data storage device includes a first data storage to store the media file and a second data storage to store the resume data.

12. The memory device of claim 1, further comprising a user interface configured to reset the memory device by deleting the resume data.

13. The memory device of claim 10, further comprising a user interface configured to reset the memory device by deleting the resume data and removing the maintained image from the display.

14. A method of reproducing data by connecting a memory apparatus storing the data to a reproducing apparatus, the method comprising:
   generating, by the memory apparatus, resume data in response to an interrupt occurring while a media file is being reproduced by the reproducing apparatus;
   storing the resume data in the memory apparatus; and
   transmitting the resume data to one of the reproducing apparatus and another reproducing apparatus,
   wherein the resume data comprises information to resume reproduction of the media file from a location at which reproduction of the media file was interrupted.

15. The method of claim 14, wherein media file includes one or more of multimedia data and an application program.

16. The method of claim 14, wherein the resume data is generated in response to stopping of reproduction of the media file caused by a manipulation of the memory device by a user.

17. The method of claim 14, wherein the resume data is generated in response to the memory device being disconnected from the reproducing apparatus.

18. The method of claim 14, wherein the resume data comprises information about one or more of the data being reproduced, information about a location at which the interrupt occurs, and information about a time when the interrupt occurs.

19. A portable memory device configured to be received by media player devices configured to play media files, the portable memory device comprising:
   a storage device to store a media file;
   an interface configured to provide the stored media file to a media player device for playback of the stored media file by the media player device; and
   a controller device configured to generate resume data in response to playback of the stored media file being interrupted, to store the resume data in the storage device, and to transmit the resume data to one of the media player device and another media player device,
   wherein the resume data comprises information to resume playback of the stored media file from a location at which playback was interrupted.

20. The memory device of claim 19, wherein the controller is configured to generate the resume data in response to manipulation of the memory device by a user.

21. The memory device of claim 19, wherein the controller is configured to generate the resume data in response to disconnecting of the memory device from the media player device.

22. The memory device of claim 19, wherein the resume data comprises one or more of information about the media file being played when playback was interrupted, information about the location at which playback was interrupted, and information about a time when playback was interrupted.

23. The memory device of claim 19, wherein the memory device is one of a Universal Serial Bus (USB) memory stick and a memory card.

24. The memory device of claim 19, further comprising a display configured to display an image corresponding to the stored media file including a visual indication that is representative of the media file being played.

25. The memory device of claim 19, further comprising a display configured to display an image corresponding to the stored media file being played, wherein the image includes one or more of a title of the stored media file and a playtime of the stored media file.

26. The memory device of claim 25, wherein the display is further configured to maintain display of the image displayed in response to playback of the stored media file being interrupted.

27. The memory device of claim 1, wherein the resume data enables a different reproducing device to resume production of the media file at the location at which the media file was interrupted while connected to the previous reproducing device.

28. The memory device of claim 1, wherein the resume data comprises an index which includes a first field comprising an identification of the media file and a second field comprising the location of the media file at which the interrupt occurred.

29. The memory device of claim 1, wherein the controller stores the resume data in the storage device, in response to the memory device being disconnected from the reproducing apparatus.

* * * * *